(12) United States Patent
Ramani et al.

(10) Patent No.: US 9,529,463 B1
(45) Date of Patent: Dec. 27, 2016

(54) METHOD AND DEVICE FOR REDUCING LATENCY FOR RENDERING AND DISPLAYING STYLUS STROKES

(71) Applicant: Amazon Technologies, Inc., Seattle, WA (US)

(72) Inventors: Ishwar VenkataManikanda Ramani, San Jose, CA (US); Kenneth James Albanowski, Fremont, CA (US); Gustavo Diaz Prado, San Jose, CA (US); Tomer Moscovich, San Francisco, CA (US); Biju Balakrishna Pillai, Cupertino, CA (US); Mark Riding, Mountain View, CA (US); Erin Rowland Garrido, San Jose, CA (US); Agus Santoso, Cupertino, CA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 23 days.

(21) Appl. No.: 14/495,350

(22) Filed: Sep. 24, 2014

(51) Int. Cl.
*G06F 3/041* (2006.01)
*G06F 3/0354* (2013.01)

(52) U.S. Cl.
CPC ........... *G06F 3/041* (2013.01); *G06F 3/03545* (2013.01)

(58) Field of Classification Search
CPC .. G06F 17/24; G06F 17/241; G06F 17/20781; G06F 3/0237
See application file for complete search history.

(56) References Cited

U.S. PATENT DOCUMENTS

| | | | |
|---|---|---|---|
| 2009/0161958 A1* | 6/2009 | Markiewicz | G06F 3/0237 345/179 |
| 2009/0327856 A1* | 12/2009 | Mouilleseaux | G11B 27/034 715/230 |
| 2015/0022463 A1* | 1/2015 | Kelso | G09G 5/00 345/173 |

* cited by examiner

*Primary Examiner* — Kevin M Nguyen
(74) *Attorney, Agent, or Firm* — Seyfarth Shaw LLP; Ilan N. Barzilay; Tyrus S. Cartwright

(57) ABSTRACT

Devices, systems, and, methods are disclosed for processing stylus interactions with a device and drawing the results of those interactions in a manner that reduces lag. This includes the introduction of a separate overlay module layer that can be updated separately from a normal view system/process of a computing device. In this respect, the overlay module layer may be used to remove unnecessary synchronization events to allow for quick display of stylus input events in the overlay module layer while still allowing the normal rendering process of the operating system to be followed.

18 Claims, 11 Drawing Sheets

METHOD AND DEVICE FOR REDUCING LATENCY FOR RENDERING AND DISPLAYING STYLUS STROKES

BACKGROUND

With the advancement of technology, the use and popularity of electronic devices, such as mobile devices, has increased considerably. Mobile devices, such as smart phones and tablet computers, typically have touch screens that enable a user to operate the devices by touching the screen with a finger or stylus type device. Stylus type devices can mimic the use of familiar writing tools, such as pens and pencils.

BRIEF DESCRIPTION OF DRAWINGS

For a more complete understanding of the present disclosure, reference is now made to the following description taken in conjunction with the accompanying drawings.

DETAILED DESCRIPTION

Figure 1:
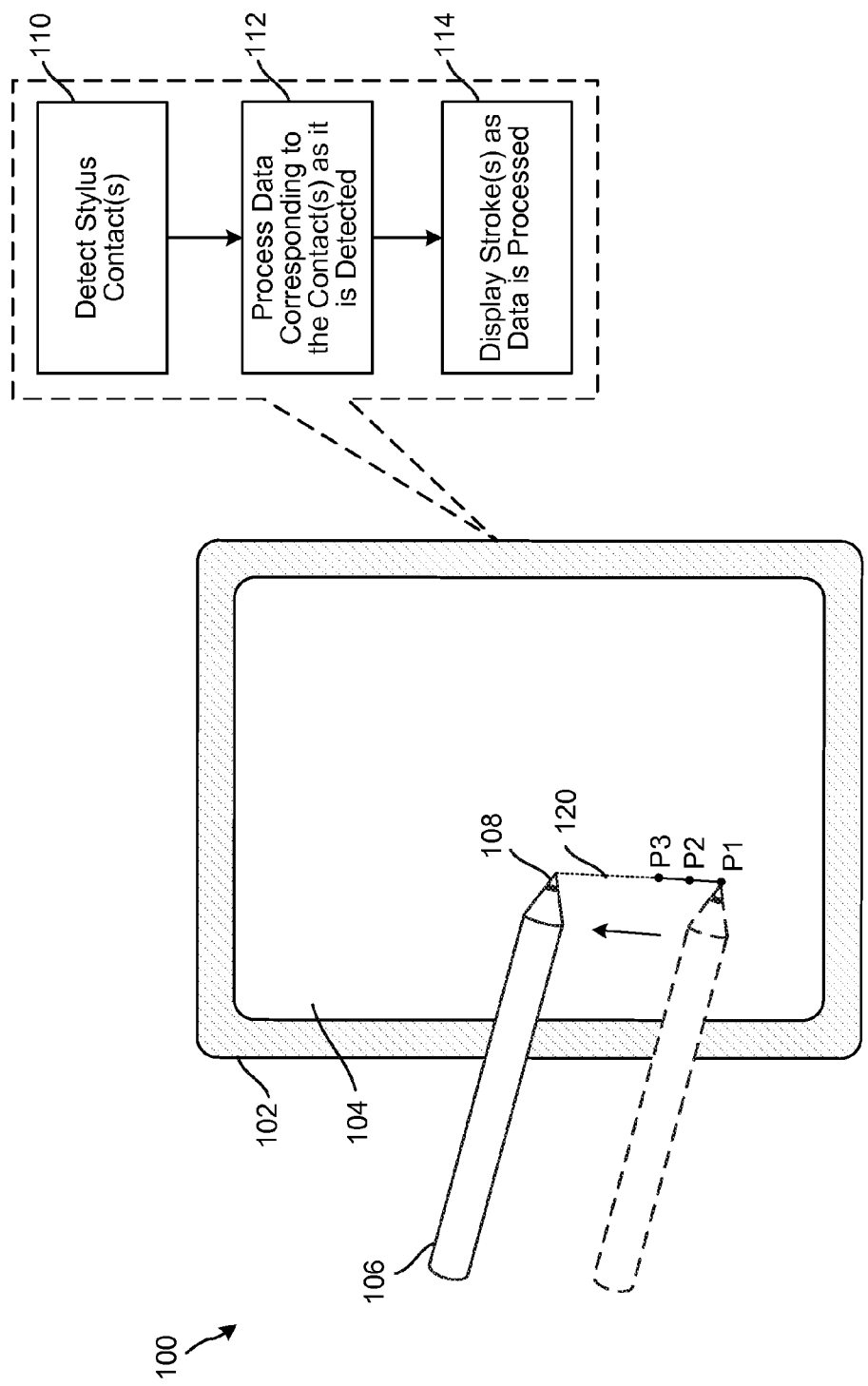
FIG. 1 illustrates an overview of a system for implementing embodiments of the present disclosure.

A stylus is typically used to write, draw and otherwise interact with a touch screen or other surface of a computing device to provide input to the computing device, such as to the programs and/or operating system running on the computing device (referred to here as "applications"). Stylus touches are processed by the computing device and the applications, as well as the screen of the computing device, and are updated accordingly. Typically, stylus touches (also called stylus inputs or input events, which are sample points that make up a stylus stroke) are gathered together in a group and processed together periodically rather than being processed one at a time. Such groups may be processed according to a rate defined by the display of the computing device. While such batching may reduce interruptions to process stylus inputs, the batching may also result in a delay from when a stylus input occurs and the time when the effect of the input appears on the screen. For example, in the case of a drawing program, the user may be drawing with the stylus but, due to the batching, there may be a noticeable delay between when the stylus moves across the screen and the corresponding pen strokes are rendered and displayed where the stylus contacted this screen. This delay can be described as a lag, both in time (for example, an amount of time it takes the rendering and display of what is being drawn to catch up with the actual movement of the stylus) and in space (for example, how far away the displayed ink is from the actual location or position of the stylus). This lag may translate into a poor, and undesired, user experience.

To address these lag issues, devices, systems and methods are disclosed that reduce the lag, both in time and space by prioritizing processing data corresponding to stylus input events (such as data corresponding to contact of a stylus on a surface of the computing device). A device may be configured with software and/or hardware components that process stylus input data as stylus events happen rather than batching such data for processing, as is the typical implementation in current systems. This allows the stylus and computing device to function more like a traditional pen and paper that users are familiar with.

One embodiment for improving the speed of rendering of stylus strokes involves separate overlay hierarchy in a computing device that can be updated separately from the normal view system/process of the operating system of the computing device. The overlay hierarchy can be provided by a variety of components. Those components may include specially configured software to process data relating to stylus input events. The components may also include specially configured hardware components, such as a frame buffer that feeds directly to a hardware pipeline or display pipeline (which is a series of components that generate pixels for display), a video controller-specific sprite or cursor layer, or other graphics layer components. Such overlay hierarchy allows data relating to stylus inputs to be pushed to the device display system separately from normal display data coming from applications of the computing device.

FIG. 1 illustrates an overview of a system 100 for implementing embodiments of the disclosure. The system includes a computing device 102 having a display screen 104, such as, a touch screen, and a stylus 106 that interacts with the display screen 104 to write, draw, or otherwise interact with one or more applications and/or processes of the computing device 102. For example, a user may interact with a drawing application running on the computing device 102 using the stylus 106. As illustrated, a tip 108 of the stylus 106 interacts with the display screen 104 to draw a stroke starting at a point P1. To draw the stroke the user may simply cause the tip 108 to come into contact with the display screen 104 at P1 and drag the tip 108 across the display screen 104 along path 120 as illustrated in FIG. 1.

To process the contact of the stylus 106, the computing device 102 determines x-y coordinate data of the contact points with the screen 104 and the time of the contact points. The computing device may also receive data from the stylus 106, such as pressure data corresponding to the contact points. For example, as the tip 108 travels along the path 120, contact is detected at point P1, then point P2, then point P3, etc. In order for the stroke being drawn to appear on the screen 104, the computing device 102 processes the data corresponding to the x-y coordinates, the time, and optionally pressure data received from the stylus 106 corresponding to each point. The computing device 102 extrapolates a line between those points, and displays the stroke on the display screen 104. This processing may occur in overlay components, as described in further detail below. Thus, as illustrated in FIG. 1, the computing device 102 detects the stylus 106 contacting the screen 104 (i.e., a stylus input event) and determines or receives data corresponding to the contact, illustrated as block 110. The computing device 102 then processes the data relating to the points of contact as they are detected, illustrated as block 112, and displays a stroke corresponding to the stylus input event(s), illustrated as block 114. In this example, the computing device 102 does not batch stylus input events together and then process the stylus input events in the batch. Rather, the computing device 102 processes the stylus input events as they are detected. This reduces lag between when the tip 108 contacts the screen 104 and the resulting stroke is displayed on the screen 104.

In one embodiment, the process used by the computing device 102 to process the data corresponding to the stylus input event(s), and to display the resulting stroke on the screen 104 quickly, may bypass certain processing steps (such as other processing by an application) that would otherwise normally be implemented before displaying the resulting stroke on the screen 104. For example, data corresponding to stylus input events may be passed to the overlay components and a function of a display compositor (such as display compositor described below) may be bypassed to display the resulting stroke more quickly.

Figure 2:
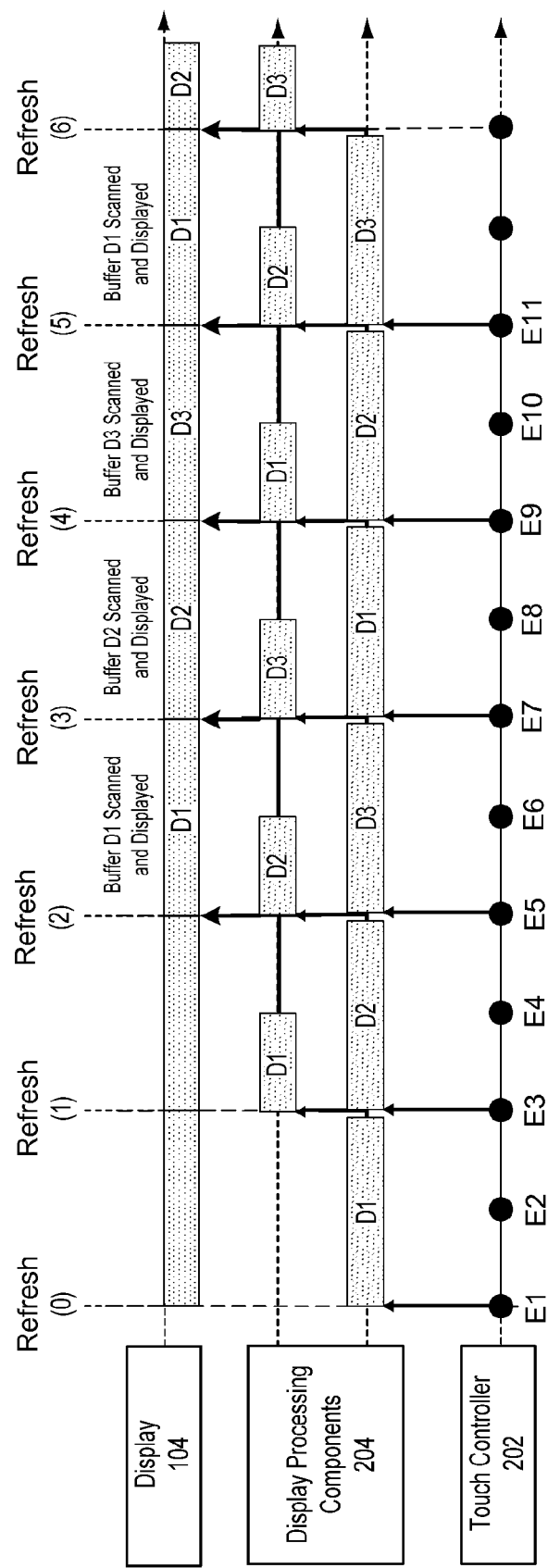
FIG. 2 is a graphical diagram conceptually illustrating an exemplary conventional method of processing input according to the prior art.

One processing method is described with reference to FIG. 2. As illustrated, a stylus input event E1 is detected, for example, by a touch controller 202 of the computing device 102. As explained below, stylus events are batched and processed at various steps according to a refresh rate, which may correspond to the refresh rate of the screen of the device operating the method 200. At an initial display frame refresh (0), data corresponding to the stylus input event E1 is sent to one or more display processing components 204, such as a drawing program that will draw a stroke corresponding to the stylus input event. The display processing component(s) 204 process the input event data (such as coordinates, time, pressure, etc.) and determine data for use in displaying the proper stroke on the display 104. This process may be referred to as "drawing" the stroke. Data about the stroke (i.e., stroke data) may be stored in a buffer, which may be one of several buffers used to store data as it is being processed. For illustration purposes, three buffers are shown, buffers D1-D3. Data for the first input event E1 is shown stored in buffer D1. The display process component(s) 204 then determines which layers (for example, which frame compositions) are to be composed and displayed on the display 104. For example, using the data in buffer D1, a frame composition may be created that includes bitmaps corresponding to the stroke data in buffer D1 that are to be displayed. It should be appreciated that the frame composition may include bitmaps relating to other data (not shown) as well as the data corresponding to the stroke. For example, the frame composition may include bitmaps relating to content corresponding to other applications operating on the computing device.

The frame composition for the buffer D1 is then processed and the frame composition (including the stroke of buffer D1) begins to be displayed on the display 104 at a second display frame refresh (2).

It should be appreciated that it may take all or a portion of the time between display frame refreshes to display the entire stroke corresponding to the frame composition for the buffer D1. This is because a typical display screen begins refreshing its image (i.e., scanning) from one edge to the other edge. For example, if the display begins scanning from a top edge, strokes drawn on the top will be scanned and physically shown prior to strokes drawn on a bottom. Thus, between the second display frame refresh (2) and a third display frame refresh (3), the display 104 shows the contents of buffer D1.

The process described above for stylus input event E1 may be repeated for each stylus input event (i.e., stylus input events E2-E11) occurring at or accumulated prior to each display frame refresh. It should be appreciated that the even numbered events (i.e., E2, E4, E6, E8 and E10) occur between two consecutive display frame refresh and are processed at the next display frame refresh following such events. For example, at the first display frame refresh (1), stylus input events E2 and E3 are processed in a similar manner as described above with respect to buffer D1. As can be seen, once data from buffer D1 is scanned and displayed (between refresh (2) and refresh (3)) buffer D1 may be used again to hold new input event data, such as event data corresponding to events E6 and E7. The process continues with the additional stylus input events E4-E11 with their data being cycled through buffers D1-D3.

As can be appreciated, in the conventional processing it may take several refresh cycles (illustrated as 2-3) between when a stylus contact point is detected and when a stroke corresponding to that stylus contact begins to be shown on display 104. The precise time of this delay may depend on factors such as the display refresh rate, the contact sampling rate of the touchscreen, the speed at which the display data is processed, etc.

To improve on the conventional approach, an overlay hierarchy/layer is introduced to process data for stylus input event(s) separately, and in parallel, to the traditional application level processing. Stylus input events are processed by the overlay hierarchy quickly so that strokes may appear on the display 104 faster than the conventional processing illustrated in FIG. 2. In parallel, the stylus input events are processed by traditional application layer components so that underlying applications can also process input event data. The stylus strokes drawn by the overlay layer may then be reconciled with stylus strokes drawn by the application layer once the application layer has completed its processing. Thus, the initial display of a stroke corresponding to a stylus input event using the overlay hierarchy/layer is separated from the processing of the stylus input event by the underlying application hierarchy/layer.

This separation may thus improve the speed at which strokes corresponding to stylus input events are displayed on the screen. In this manner, stylus strokes displayed on the screen that result from overlay layer processing may be analogized to 'wet ink' drawn on a paper where 'wet ink' strokes (also called temporary strokes) refer to strokes that appear on the screen resulting from overlay layer processing. While certain processing steps are bypassed to quickly render and display the temporary strokes, the data corresponding to the stylus input event(s) may be passed to the application layer (for example, including the application content component) and processed in the conventional manner during 'wet ink' rendering and display. The results of the application layer processing (in terms of a stroke to be displayed) may be referred to as 'dry ink' strokes (also called processed strokes), that is a processed stroke representing data corresponding to stylus contact that has been processed by the application content layer of the computing device. The processed strokes are then sent to the display and may take the place of corresponding temporary strokes, thus reconciling strokes from the overlay layer with corresponding strokes from the application layer.

The terms 'wet ink' stroke (temporary stroke) and 'dry ink' stroke (processed stroke) here are meant to invoke the different stages in processing associated with the data corresponding to the stylus input event(s). It should be appreciated that the term 'wet ink' is not necessarily intended to imply a visual characteristic that looks different than 'dry ink.' That is, 'wet ink' strokes may appear identical to 'dry ink' strokes. However, in certain other embodiments, to enhance the user experience, the computing device may be configured to display the transition of 'wet ink' strokes to 'dry ink' strokes, for example by altering the associated strokes to mimic the look of ink drying on paper.

Figure 3:
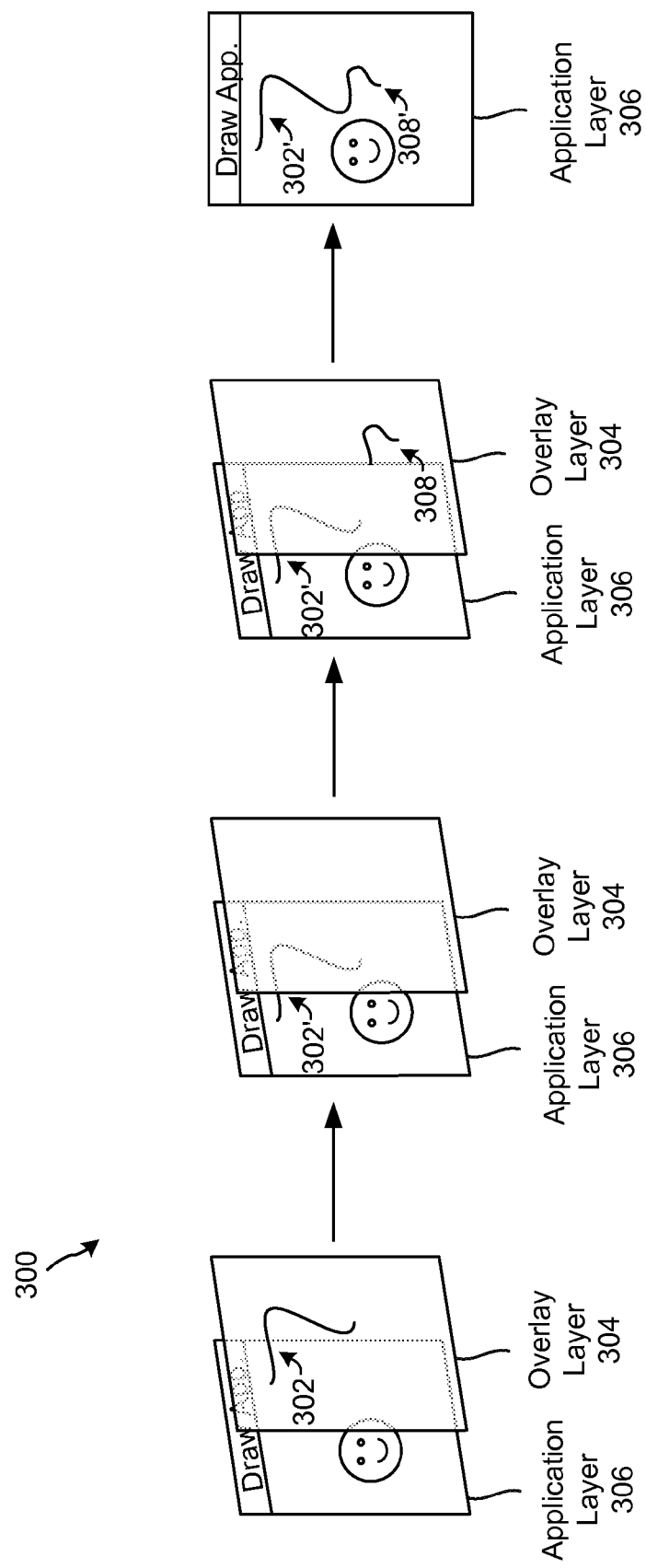
FIG. 3 is a diagram conceptually illustrating an example method of processing input using overlay components according to embodiments of the present disclosure.

FIG. 3 shows a diagram 300 conceptually illustrating the display of temporary strokes and processed strokes. When a user contacts the display/touch screen with a stylus and moves the stylus across the surface of the display/touch screen, thereby generating first stylus input events, the computing device determines data corresponding to the first stylus input event (i.e., x-y coordinates, time, etc. for each contact point). The computing device processes the data using an overlay component, and renders and displays a first temporary stroke 302 on the display via an overlay layer 304 (for example, created by the overlay display pipeline and/or the overlay component as discussed below), which is separate from, but overlays an application layer 306 (for example, created by the application display pipeline and/or the application component as discussed below). For example, a stylus input event is detected. First data corresponding to the first temporary stroke 302 to be displayed is determined and the first data is stored in a first buffer. The first temporary stroke 302 is displayed using the overlay layer 304 using the first data in the first buffer.

The data corresponding to the first stylus input event may also be processed by an application operating on the computing device. For example, the application may process the data and display a first processed stroke 302' in the application layer 306. The first processed stroke 302' is displayed at substantially the same location on the display as the first temporary stroke 302. Once the first processed stroke 302' is processed and displayed, the first temporary stroke 302 may be removed and/or considered transitioned to the application layer 306 (in the form of first processed stroke 302'). In one embodiment, the first processed stroke 302' may be processed using the conventional processing methods of the computing device, as described above in reference to FIG. 2. The first processed stroke 302' may also be displayed on the display after the first temporary stroke 302 is displayed on the display. In one embodiment, the first processed stroke 302' may be displayed on the display at the same time as the first temporary stroke 302 is removed from the display (for example, during a same display frame update or refresh process).

In another embodiment, there may be some overlap between when both the first temporary stroke 302 and first processed stroke 302' are present before the first temporary stroke 302 is removed. In one embodiment there would be no noticeable difference from the user's point of view as the first temporary stroke 302 appears identical (or at least substantially similar in appearance, location on the display, etc.) on the display of the computing device to the first processed stroke 302', even though they are treated differently as discussed herein for purposes of explaining the concept of the different layers 304 and 306. In another embodiment, the data sent to the display screen does not change, but rather the mark transitions from the first temporary stroke 302 to the first processed stroke 302' as a matter of data processing in the computing device.

When a user contacts the display/touch screen with the stylus a second time and moves the stylus across the surface of the display/touch screen, thereby generating second stylus input events, the computing device determines data corresponding to the second stylus input events (i.e., x-y coordinates, time, etc. for each contact point of the second stylus input events). The computing device processes the data corresponding to the second stylus input events, and renders and displays a second temporary stroke 308 as on the display in the overlay layer 304. Again, once the second stylus input events are processed using the conventional methods of the computing device, the display of the second stroke from the second stylus input events transitions from the second temporary stroke 308 to the second processed stroke 308' in the application layer. Thus, afterwards both processed strokes 302' and 308' are displayed in the application layer 306. It should also be appreciated that other windows, functionality and/or markings (such as the face illustrated in FIG. 3) may be present and operating in the application layer while the data corresponding to the stylus input events is being processed and the strokes are displayed.

Figure 4:
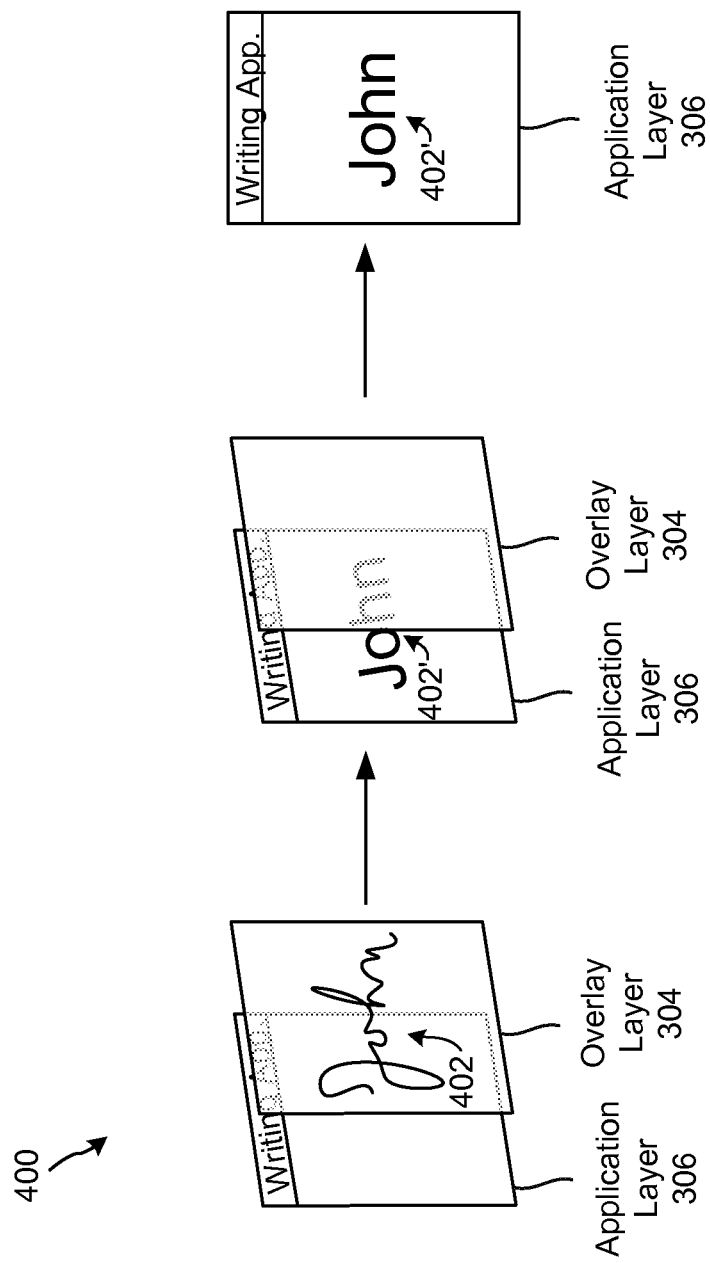
FIG. 4 is a diagram conceptually illustrating another example method of processing input using overlay components approach according to embodiments of the present disclosure.

In another embodiment, the temporary stroke may be different from the processed stroke. FIG. 4 is a diagram 400 conceptually illustrating the display of temporary strokes and processed strokes according to this embodiment. A user contacts the display/touch screen with the stylus and moves the stylus across the surface of the display/touch screen, thereby generating stylus input events, for example to write a name 'John' 402. The computing device determines data corresponding to the stylus input events (i.e., x-y coordinates, time, etc. for each contact point). The computing device processes the data corresponding to the stylus input events, and renders and displays a temporary stroke 402 on the display using the overlay layer 304. In this embodiment, the stylus input event is intended for a writing program that processes written letters into text. Thus, application layer 306 is associated with the writing program. In this case, instead of processing the data corresponding to the stylus input events and displaying a stroke similar to that of the temporary stroke 402, the application processed the data corresponding to the stylus input events and generates text corresponding to the stylus input event data. Once the stylus input events are processed, the temporary stroke 402 transforms to a processed stroke corresponding to text 402' in the application layer which display the text 402'. The display may continue to show temporary stroke 402 for a period of time, thus providing visual feedback to the user of the stylus input event. After the period of time the temporary stroke 402 will be removed leaving only the text 402' of the writing program/application. It should be appreciated that other effects can be implemented by the application to apply other processing techniques to the stroke. For example, smoothing, edge effects, line thicknesses, and other transformations may be applied to cause the application to display the appropriate item/visual features when the temporary stroke transitions to the application layer 306.

Figure 5:
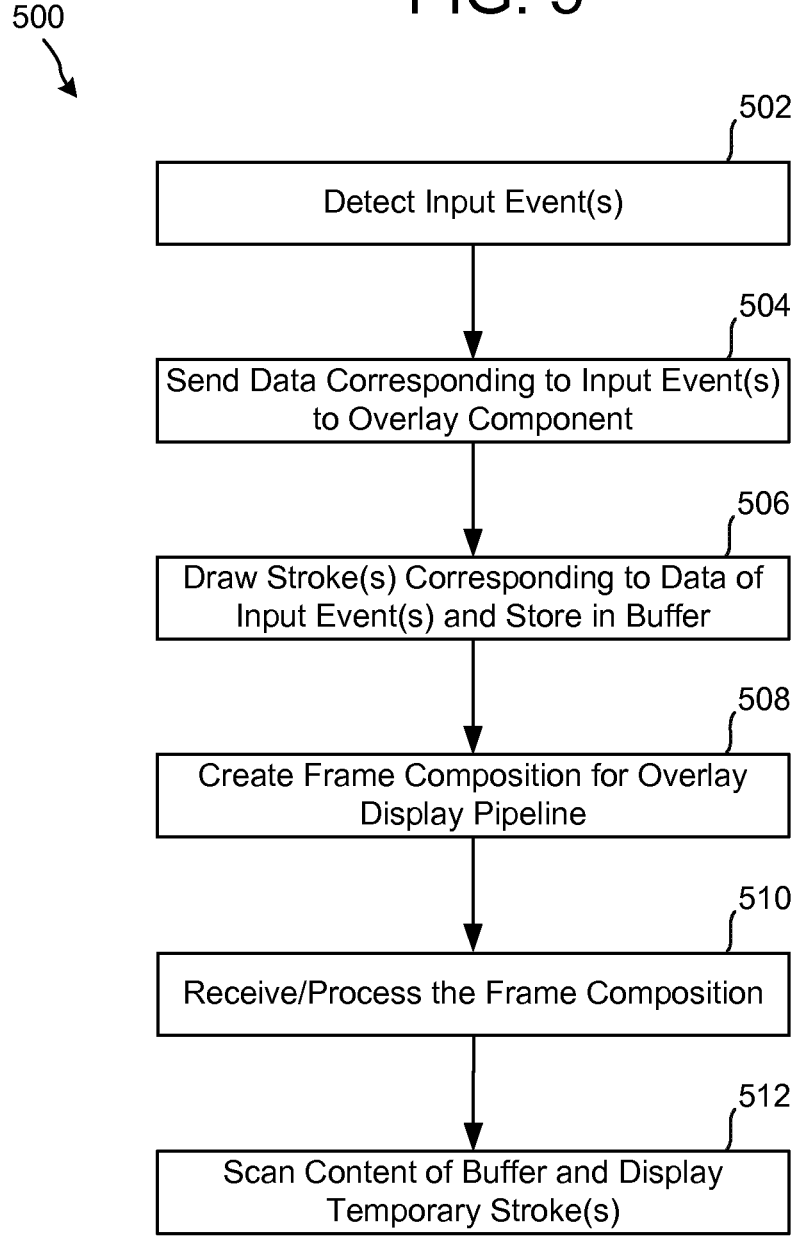
FIG. 5 is a block diagram conceptually illustrating an example method of processing input according to embodiments of the present disclosure.

FIG. 5 illustrates an exemplary method 500 of processing data corresponding to stylus input events and displaying strokes corresponding to the data as temporary strokes according to the disclosure. This method reduces the time it takes for an application to display strokes corresponding to data of stylus input events by causing the data to be sent to and processed by an overlay component, thus bypassing certain processing steps, for example processing by a display compositor as described below. This allows for quick display of temporary strokes in an overlay layer, via an overlay display pipeline of a display subsystem of the computing device, while still following the normal rendering process of the operating system (such as the Android operating system) of the computing device. As illustrated in block 502, a stylus input event(s) is detected, for example, by the touch controller of the computing device. Data corresponding to the stylus input event(s) is sent to the overlay component, illustrated as block 504. The overlay component draws a stroke(s) corresponding to the stylus input event(s) and stores data about the stroke(s) in a buffer, (for example, as directed by the overlay component described in further detail below), illustrated as block 506. The overlay component may also incorporate an identifier into the buffer to allow other components, such as the display compositor and hardware composer, to identify the data in the buffer as corresponding to the overlay component.

The data in the buffer is sent to a hardware composer of the computing device and a frame composition may then be created for the overlay display pipeline using the buffer, illustrated as block 508. The hardware composer may also determine and assign the frame composition to a hardware pipeline. The hardware pipeline may be one or more components within the processor's display subsystem. The hardware pipeline may include a set of components, such as hardware post-processing blocks (such as a graphics processing unit), for performing post processing functions on the data in the buffer, such as color conversion, scaling, texturing, modeling, and associated input/output memory management, etc. For example, based on the identifier, the hardware composer assigns the frame composition to an overlay display pipeline of the display subsystem. The frame composition is then received/processed, illustrated as block 510. The frame composition may be received/processed, for example, by the display subsystem. For example, the display subsystem scans the buffer and a temporary stroke is displayed, illustrated as block 512.

Figure 6:
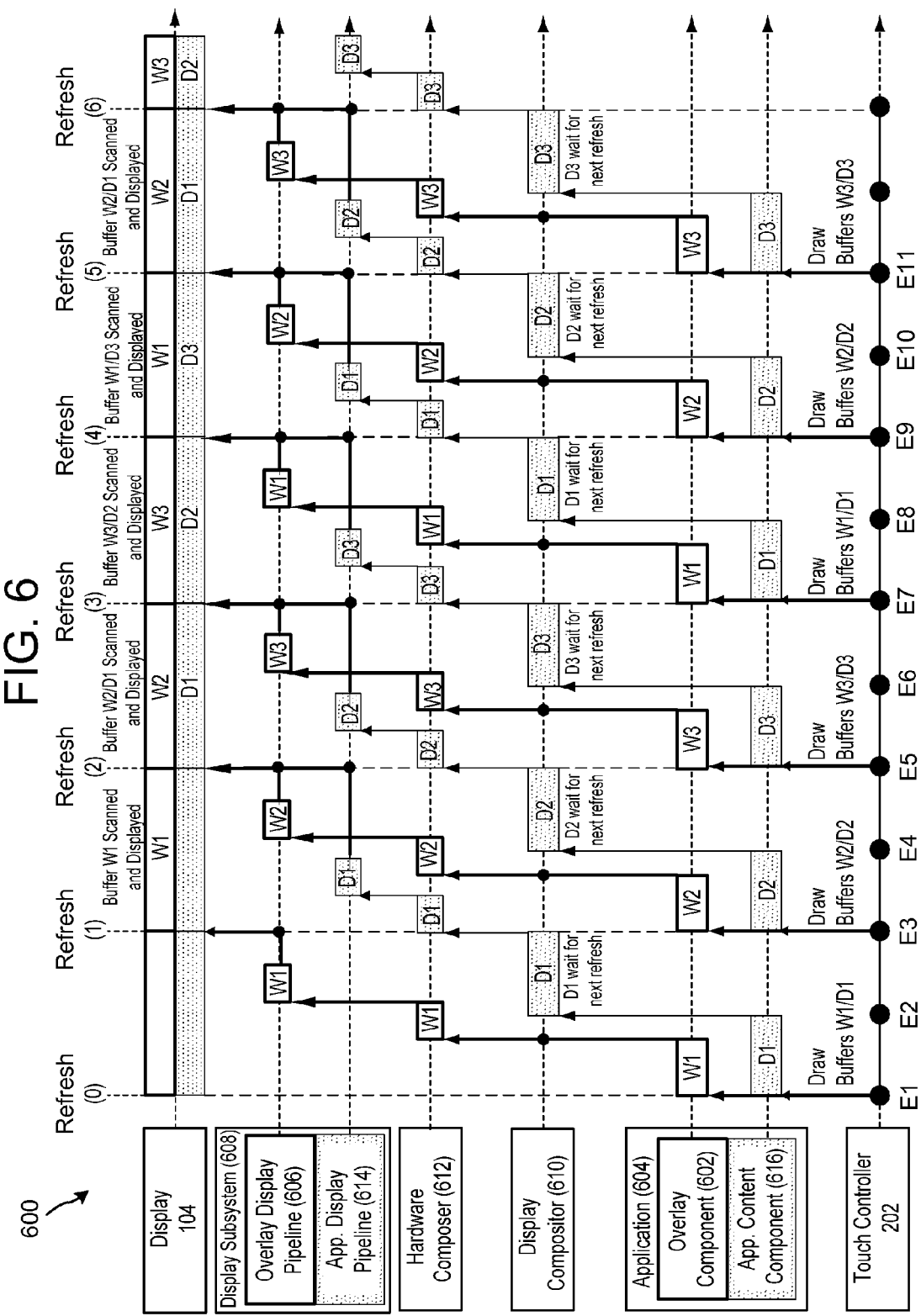
FIG. 6 is a graphical diagram conceptually illustrating an example method of processing input according to embodiments of the present disclosure.

FIG. 6 illustrates an exemplary process 600 for processing stylus input event data and displaying corresponding strokes as temporary strokes according to the disclosure. As illustrated, FIG. 6 includes special components of an overlay hierarchy including an overlay component 602 within an application 604 and an overlay display pipeline 606 within display subsystem 608. The overlay hierarchy may also include other components. The overlay layer as referred to herein may include, and make use of data processed by, components from the overlay hierarchy such as the overlay component 602 and overlay display pipeline 606. The overlay layer may also include software layer dedicated for the display of temporary strokes. The overlay layer may also be used as an abstraction to illustrate the separate processing of temporary strokes from processed strokes using components of the overlay hierarchy.

As shown in FIG. 6, at an initial display frame refresh (0) a stylus input event E1 is detected, for example, by the touch controller 202. Data corresponding to the stylus input event E1 is sent to the overlay component 602, implemented in the application 604, which draws a stroke corresponding to the stylus input event E1 and stores data about the stroke in buffer W1. The overlay component 602 may also insert an identifier into the data to indicate that the data corresponds to the overlay component 602 and/or overlay hierarchy.

The contents of buffer W1 are passed to a display compositor 610 once buffer W1 is populated. The display compositor 610 simply passes the contents of buffer W1 to the hardware composer 612 without performing additional processing. For example, the display compositor 610, based on the identifier, determines that the contents of the buffer W1 correspond to the overlay component 602 and thus passes the contents of buffer W1 to the hardware composer 612, without additional processing or waiting for the next refresh. In this manner the contents of buffer W1 are quickly pushed to the hardware composer 612.

The hardware composer 612 creates a frame composition using the data in buffer W1 (i.e., an image frame for display 104 that includes what the data in buffer W1 will look like on the display 104) and assigns a hardware pipeline to the frame composition. In this embodiment, the hardware composer 612 assigns the data of buffer W1 to an overlay display pipeline 606 of the display subsystem 608, based on the identifier. The overlay display pipeline 606 may be a hardware pipeline dedicated for handling the display of data corresponding to the overlay component 602. The overlay display pipeline 606 of the display subsystem 608 receives the frame composition for the buffer W1 and causes the buffer to be scanned and a temporary stroke corresponding to the stylus input event E1 to be displayed on the display 104 in the overlay layer (which may include a software layer dedicated for the display of temporary strokes) at a first display frame refresh (1), after the initial display frame refresh (0).

Returning to the input event E1, in an embodiment, the data corresponding to event E1 may be passed from the overlay component 602 to an application content component 616 for processing and display of the processed stroke. The application content component 616 may be software associated with a particular program and/or may be part of the device operating system. In another embodiment, the data corresponding to the stylus input event E1 may be sent to the application content component 616 for processing in parallel with the overlay component 602. For example, at the initial display frame refresh (0), data corresponding to the stylus input event E1 may also be sent to the application content component 616 of the application 604 in addition to the overlay component 602. The application content component 616, according to the operation of the particular application, draws a stroke corresponding to the stylus input event E1 and stores data about the stroke in buffer D1. The contents of the buffer D1 are passed to the display compositor 610 upon completion. The display compositor 610 holds the buffer D1 until the first (i.e., next) display frame refresh (1). At the first display frame refresh (1), the contents of buffer D1 are passed to the hardware composer 612, which creates a frame composition for the buffer D1 and assigns a hardware pipeline to the frame composition. As described above, the hardware pipeline may include a set of components for performing post processing functions, such as color conversion, scaling, and associated input/output memory management, etc. In this embodiment, the hardware composer 612 assigns the frame composition to the application display pipeline 614 of the display subsystem 608. The frame composition for the buffer D1 is then passed to the application display pipeline 614, which processes the frame composition including the data in buffer D1 and causes the contents of the buffer D1 to be scanned and a processed stroke corresponding to the stylus input event E1 to be displayed on the display 104 in the application layer (which is part of the application content component 616) at a second display frame refresh (2). Thus, the temporary stroke may be displayed a full display frame refresh prior to the processed stroke.

It should be appreciated that it may take all or a portion of the time between display frame refreshes to display all of the temporary stroke and/or processed stroke. Thus, between the first display frame refresh (1) and second display frame refresh (2), the display 104 shows the temporary stroke corresponding to buffer W1 and between the second display frame refresh (2) and a third display frame refresh (3), the display 104 shows the contents of buffer W2 and D1, and so on.

The process described above for the stylus input event E1 may be repeated for each stylus input event (i.e., stylus input events E2-E11) occurring at or accumulated prior to each display frame refresh. It should be appreciated that data corresponding to the even numbered stylus input events (i.e., E2, E4, E6, E8 and E10) are processed at the next display frame refresh following such events. For example, at the first display frame refresh (1), data corresponding to stylus input events E2 and E3 are sent to the overlay component 602, which draws stroke(s) corresponding to the data and stores the stroke(s) in buffer W2. Similarly, the data corresponding to stylus input events E2 and E3 may be sent to the application content component 616, which draws stroke(s) corresponding to the data and stores the stroke(s) in buffer D2.

The buffers W2 and D2 are then processed in a similar manner as described above with respect to buffers W1 and D1. The process continues with the additional stylus input events E4-E11. While the strokes corresponding to the buffer contents are shown on the display 104, other items may also be shown on the display 104, for example markings corresponding to previous, unillustrated, touch events that have not been erased or otherwise cleared off the display 104 during other operation of the computing device (not discussed here).

Buffers W1-W3 may be separate buffers assigned to the overlay hierarchy and may be used to process temporary strokes of 'wet ink' (hence the "W") where traditional buffers D1-D3 may be used to handle data for processed strokes of 'dry ink' (hence the "D"). In another embodiment the buffers may be a pool of buffers that may be used for different purposes depending on the needs of the device.

The overlay component 602 may also include a feedback mechanism for recovering from display buffering. If processing of certain date in the display pipeline takes too long, the display pipeline may suffer from latency that results in buffering and may impact the user experience. For example, the data exchange from the overlay component 602 or the application content component 616 to the display compositor 610, and the data exchange from the display compositor 610 to the hardware composer 612, may provide points of buffer exchange for the buffers W1-W3. Buffering at these stages reduces the chance of the pipeline from becoming backed up and locking and allows it to recover. In an example, the hardware composer 612 could take a long time to create the frame composition for the buffer W1. This could cause the buffer W1 to be delayed in reaching the display 104. For example, instead of reaching the display 104 at refresh 1, W1 may reach the display at refresh 2. When this happens both buffers W1 and W2 would be in the queue to be displayed at refresh 2. However, only buffer W1 will be displayed at refresh 2, and then buffer W2 will be delayed and displayed at refresh 3. Thus, a latency of one refresh is introduced due to the hardware composer 612 failing to create the frame composition for the buffer W1 in time. To account for this and address the latency issue, the buffering state of the display pipeline may be communicated to the overlay component 602. The overlay component 602 can use this feedback to keep track of the buffering state and skip frames or hold drawing buffers to drain the buffer queue allowing for the display to catchup with the input events. For example, knowing that a latency of one refresh has been introduced, the overlay component can skip the drawing of buffer W3 and then draw the second buffer W1 at refresh 3. In this respect, the overlay component 602 may batch the input events E4 and E5 (which have not been drawn yet) into the second buffer W1 with input events E6 and E7 to allow the display to catch up with the input events. The second buffer W1 may also batch and draw the prior input events E1-E3 along with the input events E4-E7, thus allowing input events E1-E7 to be drawn and displayed to remove the one refresh latency that was introduced.

In another aspect, to achieve consistency during the detection of input events and the display of those input events within the refresh times, the overlay component 602 may dynamically configure computing resources, such as central processing unit (CPU) resources, to handle stylus drawing processes. For example, the overlay component 602 may bind and unbind processes or threads of the CPU for display tasks, adjust the clocks of the CPU, reserve CPU resources, control the core of the CPU and frequency with the core is run to perform the processing of the data corresponding to the input events and the display of strokes corresponding to the input events, etc., to allow the processing of the data corresponding to the input events to fit within the refresh times. Adding such resource allocation capabilities allows the overlay component 602 to dynamically configure the CPU reservation when it detects high latencies to make the display processing consistent and deterministic during the writing/drawing experience.

Figure 7:
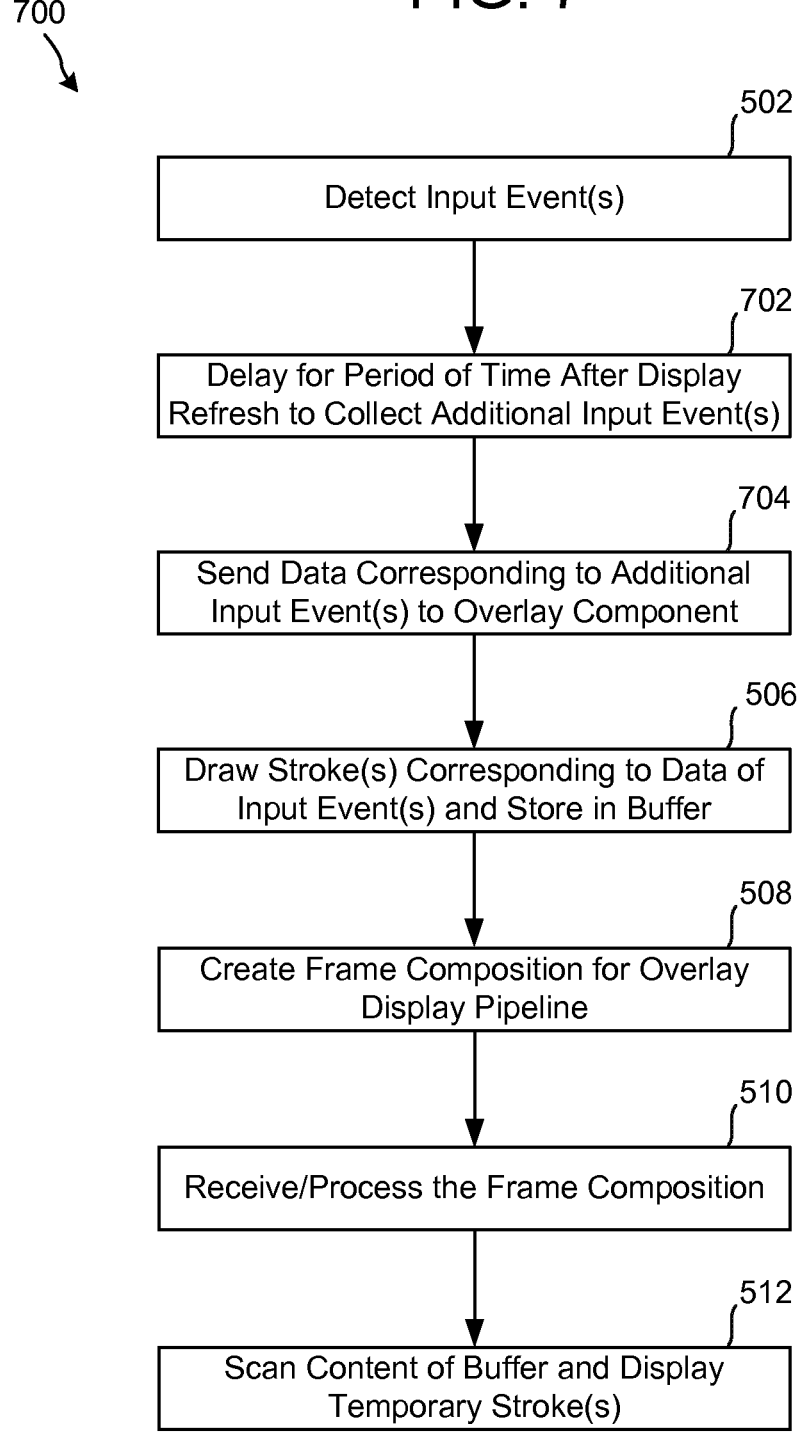
FIG. 7 is a block diagram conceptually illustrating an example method of processing input according to embodiments of the present disclosure.

FIG. 7 illustrates an exemplary method 700 of processing data corresponding to stylus input events and displaying temporary strokes corresponding to the data using the overlay hierarchy according to the disclosure. In this embodiment, after a display frame refresh occurs, a delay is introduced in the drawing phase to allow for the possibility of collecting additional stylus input events prior to drawing the temporary strokes. This delay allows the most recent stylus input event possible to be detected, and a stroke corresponding to the stylus input event drawn without causing visual artifacts (such as blurred edges, and other anomalies). By using the same process using the overlay component to draw and display temporary strokes described above with reference to FIGS. 5 and 6, the introduction of a delay allows certain stylus input events to be processed together while still resulting a lower lag from conventional processing.

As illustrated in block 502 of FIG. 7, a stylus input event is detected. The stylus input event may be sent to the overlay component. A delay is introduced for a period of time, in which the overlay component holds the input event and waits to collect any additional stylus input events that may occur, illustrated as block 702. Data corresponding to the additional stylus input event(s) is sent to the overlay component, illustrated as block 704. The overlay component draws stroke(s) corresponding to the stylus input event(s) and stores data about the stroke(s) in a buffer, (for example, as directed by the overlay component), illustrated as block 506. A frame composition may then be created for the overlay display pipeline of the display subsystem using the data in the buffer, illustrated as block 508. The frame composition is then received/processed, for example, by the display subsystem, illustrated as block 510. The frame composition may then be received/processed. For example, the display subsystem scans the buffer and a temporary stroke is displayed, illustrated as block 512.

Figure 8:
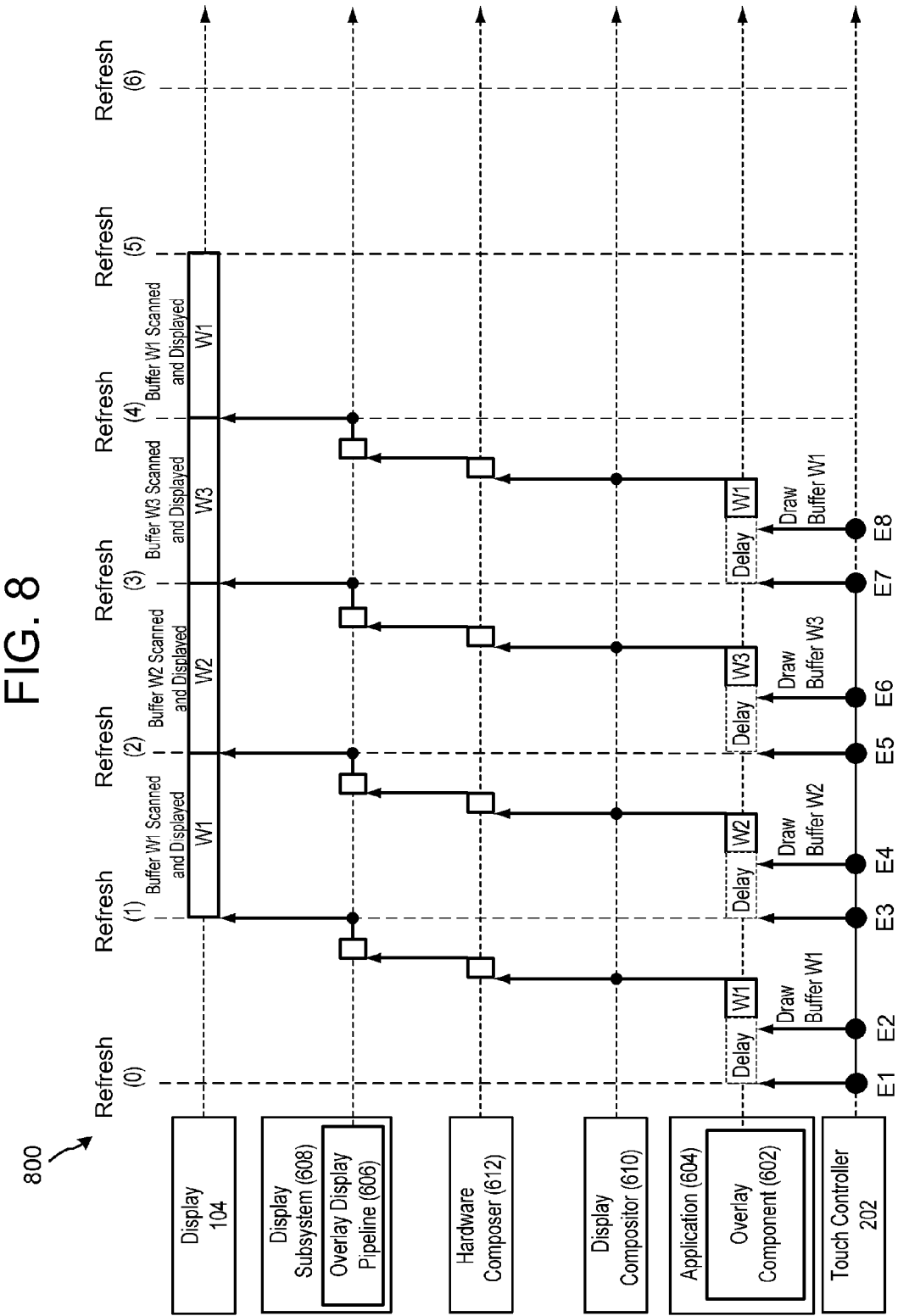
FIG. 8 is a graphical diagram conceptually illustrating an example method of processing input according to embodiments of the present disclosure.

FIG. 8 illustrates an exemplary method 800 in graphical form for processing data corresponding to stylus input events and displaying temporary strokes according to the method of FIG. 7. At the initial display frame refresh (0) a stylus input event E1 is detected, for example, by the touch controller 202. Data corresponding to the stylus input event E1 is sent to the overlay component 602. The overlay component 602 holds the stylus input event E1 for a delay period. The delay is introduced to allow any additional stylus input events that may occur within the delay period to be collected. As illustrated, a second stylus input event E2 occurred within the delay period. Thus, data corresponding to both stylus input events E1 and E2 is sent to the overlay component 602, which draws strokes corresponding to the data relating to stylus input events E1 and E2 and stores the strokes in a buffer W1.

As described above with reference to FIG. 6, the contents of buffer W1 are passed to the display compositor 610 upon completion. The display compositor 610 simply passes the contents of buffer W1 to the hardware composer 612, which creates a frame composition for the buffer W1 and assigns a hardware pipeline to the frame composition. In this embodiment, the hardware composer 612 assigns the frame composition to the overlay display pipeline 606 of the display subsystem 608. The overlay display pipeline 606 of the display subsystem 608 receives the frame composition for the buffer W1 and causes the buffer to be scanned and one or more temporary strokes corresponding to the stylus input events E1 and E2 to be displayed on the display 104 in the overlay layer at the first display frame refresh (1). The delay allows for the collection of additional stylus input events (i.e., E1 and E2) and the display of temporary strokes corresponding to these stylus input events (i.e., E1 and E2) on the display frame refresh following such stylus input events.

The process described above for stylus input events E1 and E2 may be repeated for the additional stylus input events (i.e., stylus input events E3-E8) occurring at or accumulated prior to each display frame refresh. For example, the overlay component 602 holds stylus input event E3 for the delay period and receives data corresponding to stylus input event E4 during the delay period after display frame refresh (1), which draws strokes corresponding to the data relating to stylus input events E3 and E4 and stores the strokes in a buffer W2. The buffer W2 is then processed in a similar manner as described above with respect to buffer W1. The process continues with the additional stylus input events E5-E8. It should be appreciated that processed strokes (i.e., those processed using the application content component) may also be processed in parallel as described above with reference to FIG. 6 in order to replace the temporary strokes.

The delay of FIG. 7 and FIG. 8 may be configured to have a length such that input events occurring before the delay may still be processed and displayed by a next refresh. For example, as shown in FIG. 8, events E1 and E2 are included in buffer W1 and temporary strokes corresponding to E1 and E2 are displayed between refresh (1) and refresh (2). Thus, even though a delay is introduced, strokes corresponding to events E1 and E2 are still displayed on display 104 faster than they would have been in the traditional processing pipeline of FIG. 2.

Figure 9:
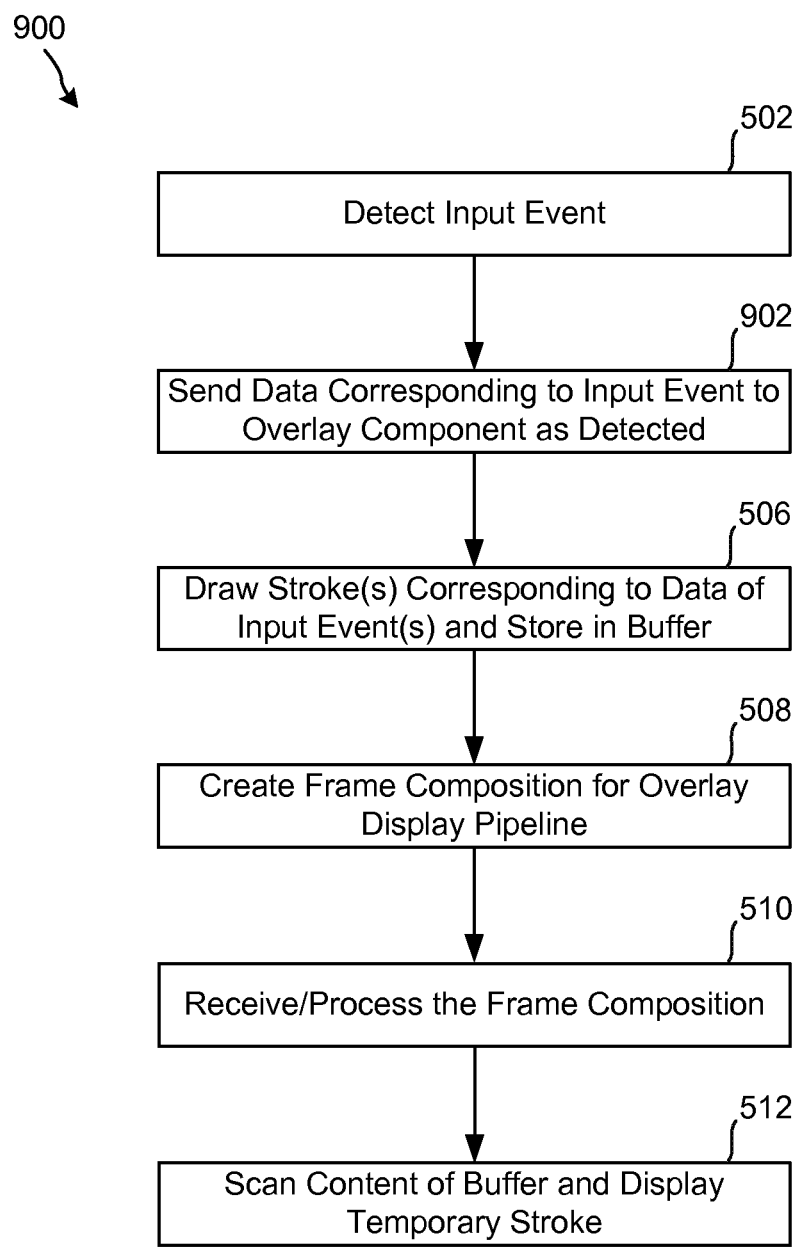
FIG. 9 is a block diagram conceptually illustrating another example method of processing input according to embodiments of the present disclosure.

FIG. 9 illustrates an exemplary method 900 of processing data corresponding to individual stylus input events as the stylus input events are detected according to the disclosure. This method sends individual stylus input events to the overlay component as the respective stylus input event are detected, instead of waiting for a next display frame refresh. Thus the method 900 allows the respective stylus input event to be processed right away, prior to the occurrence of the next display frame refresh. As illustrated in block 502 of FIG. 9, a stylus input event is detected. As the stylus input event is detected, data corresponding to the stylus input event is sent to the overlay component, illustrated as block 902. The overlay component a draws stroke corresponding to the stylus input event and stores data about the stroke in a buffer, (for example, as directed by the overlay component), illustrated as block 506. A frame composition may then be created for the overlay display pipeline of the display subsystem using the buffer, illustrated as block 508. The frame composition is then received/processed, for example, by the display subsystem, illustrated as block 510. The frame composition may then be received/processed. For example, the display subsystem scans the buffer and a temporary stroke is displayed, illustrated as block 512.

Figure 10:
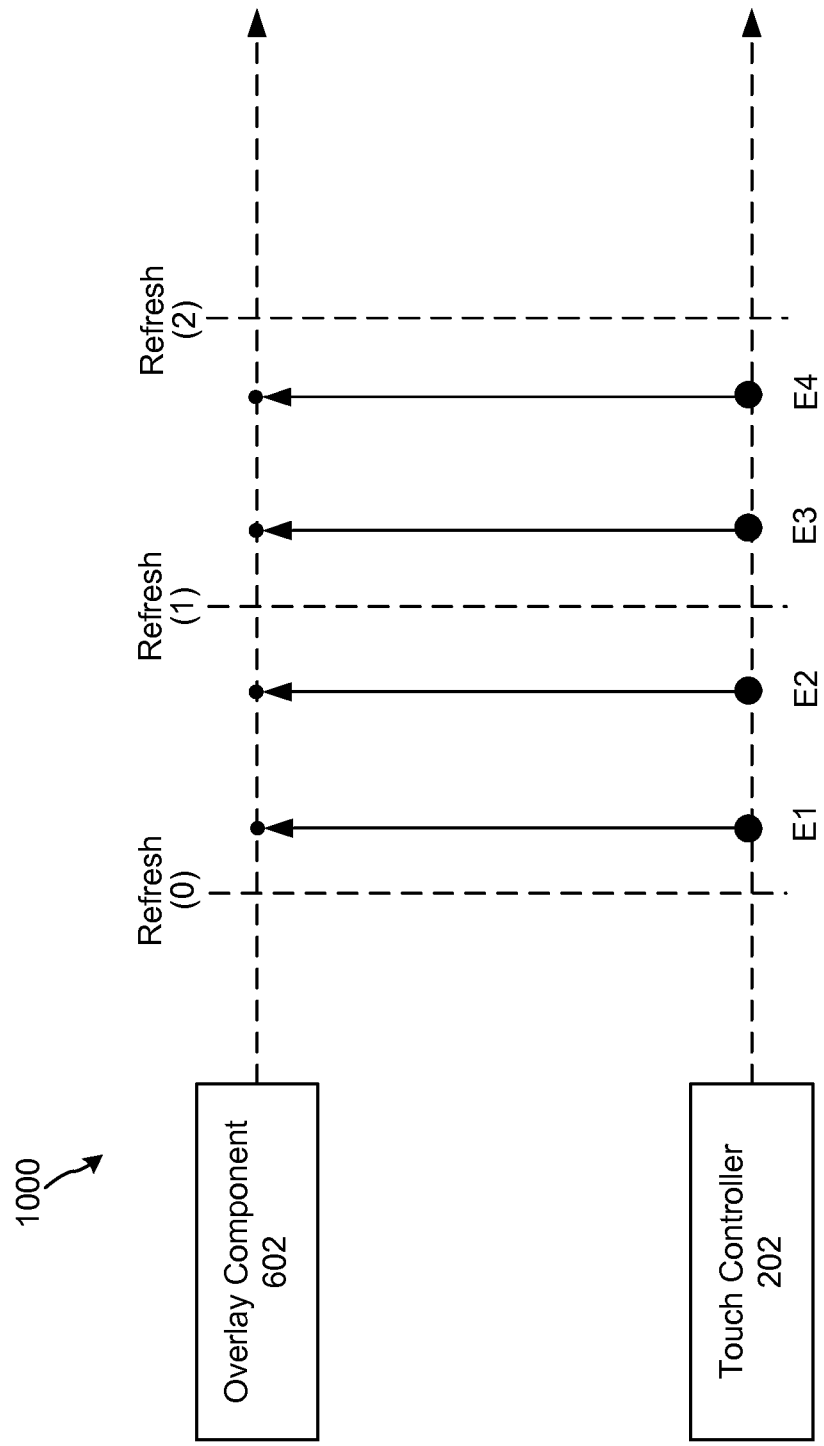
FIG. 10 is a graphical diagram conceptually illustrating another example method of processing input according to embodiments of the present disclosure.

FIG. 10 illustrates an exemplary method 1000 for processing data from individual stylus input events illustrating an example of the method 900. As illustrated in FIG. 10, when a stylus input event E1 is detected, for example, by the touch controller 202, data corresponding to the stylus input event E1 is sent to the overlay component 602 for processing, without waiting for a display frame refresh. This process is repeated for additional stylus input events E2, E3, and E4. As the respective stylus input events E1 and E2 are detected between the initial display frame refresh (0) and the first display frame refresh (1) and data corresponding to the respective stylus input events E1 and E2 is sent to the overlay component 602 prior to first display frame refresh (1) occurring, temporary strokes corresponding to the stylus input events E1 and E2 may be displayed upon the occurrence of the first display frame refresh (1), in accordance with the processing methods described above with reference to FIGS. 6 and 8. Similarly, as the stylus input events E3 and E4 are detected between the first display frame refresh (1) and a second display frame refresh (2) and data corresponding to the respective stylus input events E3 and E4 is sent to the overlay component 602 prior to second display frame refresh (2) occurring, temporary strokes corresponding to the stylus input events E3 and E4 should be drawn on the display upon the occurrence of the second display frame refresh (2).

While, the methods and processes described above are describe in connection with stylus input events, it should be appreciated that other input events, such as those from a user (i.e., a user's finger) may also be processed in the same manner. Additionally, input events from a stylus and/or a user's touch may be identified and/or classified as such by the computing device to allow the computing device to distinguish the input events to be processed using the overlay component from input events from other devices, such as audio input, etc.

Figure 11:
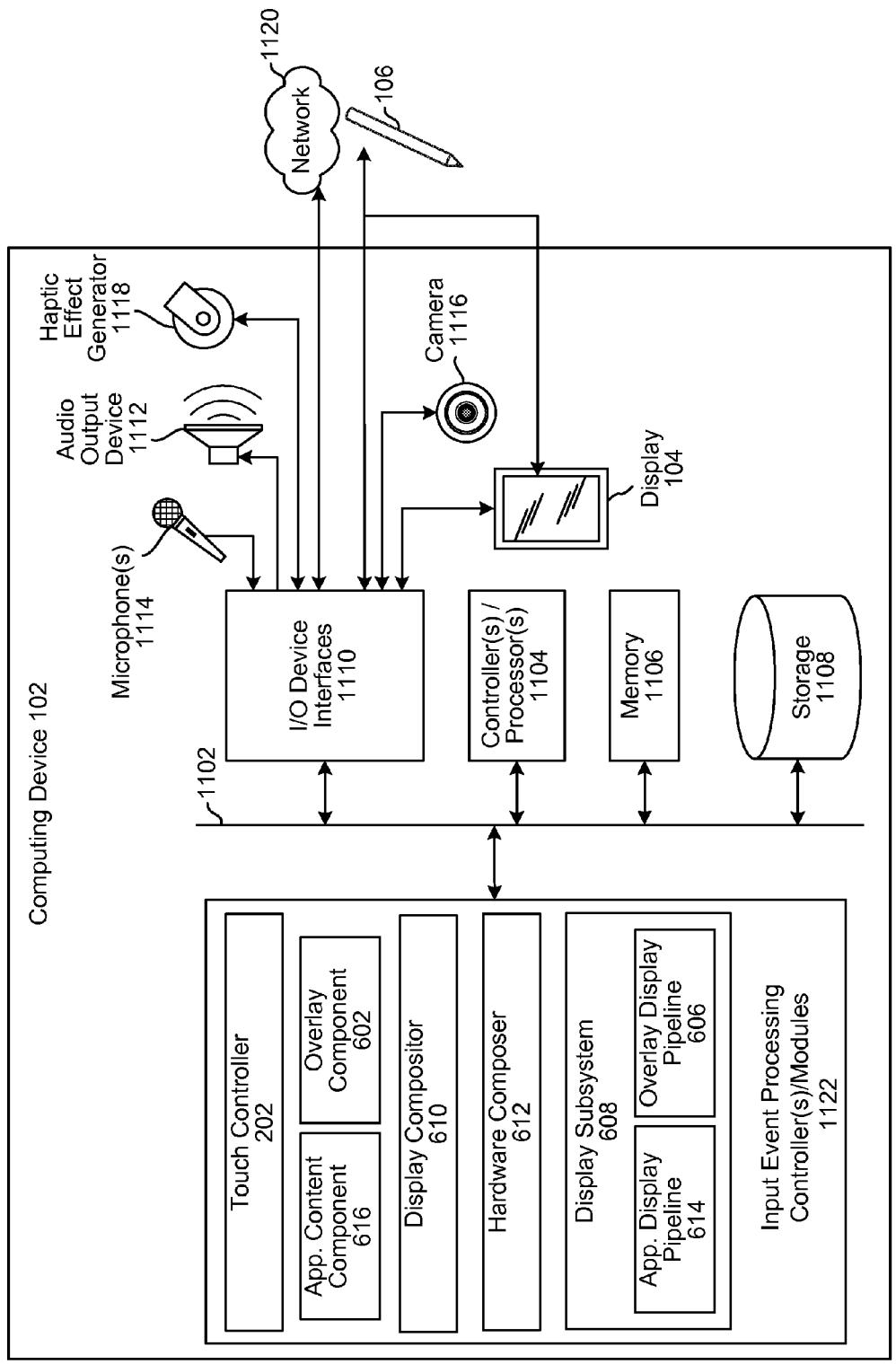
FIG. 11 is a block diagram conceptually illustrating example components of a computing device according to embodiments of the present disclosure.

FIG. 11 is a block diagram conceptually illustrating example components of the computing device 102. In operation, the computing device 102 may include computer-readable and computer-executable instructions that reside on the computing device 102, as is discussed further below.

As illustrated in FIG. 11, the computing device 102 may include an address/data bus 1102 for conveying data among components of the computing device 102. Each component within the computing device 102 may also be directly connected to other components in addition to (or instead of) being connected to other components across the bus 1102.

The computing device 102 may include one or more microcontrollers/controllers/processors 1104 that may each include a central processing unit (CPU) for processing data and computer-readable instructions, and a memory 1106 for storing data and instructions. The memory 1106 may include volatile random access memory (RAM), non-volatile read only memory (ROM), non-volatile magnetoresistive (MRAM) and/or other types of memory. The computing device 102 may also include a data storage component 1108, for storing data and microcontrollers/controller/processor-executable instructions (e.g., instructions to perform one or more steps of the methods illustrated in and described with reference to FIGS. 1-10). The data storage component 1108 may include one or more non-volatile storage types such as magnetic storage, optical storage, solid-state storage, etc. The computing device 102 may also be connected to removable or external non-volatile memory and/or storage (such as a removable memory card, memory key drive, networked storage, etc.) through input/output device interfaces 1110.

Computer instructions for operating the computing device 102 and its various components may be executed by the microcontroller(s)/controller(s)/processor(s) 1104, using the memory 1106 as temporary "working" storage at runtime. The computer instructions may be stored in a non-transitory manner in non-volatile memory 1106, storage 1108, or an external device. Alternatively, some or all of the executable instructions may be embedded in hardware or firmware in addition to or instead of software.

The computing device 102 includes input/output device interfaces 1110. A variety of components may be connected through the input/output device interfaces 1110, such as the display or display screen 104 having a touch surface or touch screen; an audio output device for producing sound, such as speaker(s) 1112; one or more audio capture device(s), such as a microphone or an array of microphones 1114; one or more image and/or video capture devices, such as camera(s) 1116; one or more haptic effect generators 1118; and other components. The display 104, speaker(s) 1112, microphone(s) 1114, camera(s) 1116, haptic effect generator(s) 1118, and other components may be integrated into the computing device 102 or may be separate.

The display 104 may be a video output device for displaying images. The display 104 may be a display of any suitable technology, such as a liquid crystal display, an organic light emitting diode display, electronic paper, an electrochromic display, a cathode ray tube display, a pico projector or other suitable component(s). The display 104 may also be implemented as a touch screen and may include components such as electrodes and/or antennae for use in detecting stylus input events.

The input/output device interfaces 1110 may also include an interface for an external peripheral device connection such as universal serial bus (USB), FireWire, Thunderbolt or other connection protocol. The input/output device interfaces 1110 may also include a connection to one or more networks 1120 via an Ethernet port, a wireless local area network (WLAN) (such as WiFi) radio, Bluetooth, and/or wireless network radio, such as a radio capable of communication with a wireless communication network such as a Long Term Evolution (LTE) network, WiMAX network, 3G network, etc. The stylus 106 may connect to the computing device 102 via one of these connections. The touch screen of the display 104 and the stylus 106 may also communicate data or operating information to one another to enable the computing device 102 to determine a position of the stylus 106. Additionally, in some embodiments, the computing device 102 (for example, the touch screen) and the stylus 106 may communicate using electromagnetic communications (for example, electric fields generated by each device to transmit data on a carrier frequency), and/or haptic communications.

The computing device 102 further includes touch input processing controllers/modules 1122 that interacts with the stylus 106 to detect stylus input events, receive and/or generate data corresponding to the stylus input events and process the data to display temporary and processed strokes on the display screen 104. Some or all of the controllers/modules of the stylus input event processing controllers/modules 1122 may be executable instructions that may be embedded in hardware or firmware in addition to, or instead of, software. In one embodiment, the computing device 102 may operate using an Android® operating system (such as, Android® 4.3 Jelly Bean and/or Android® 4.4 KitKat).

The stylus input event processing controllers/modules 1122 may include the touch controller 202, the application content component 616, the overlay component 602, the display compositor 610, the hardware composer 612, the display subsystem 608, and/or other controllers/modules and/or processes normally associated with the operating system of the computing device 102, such as the Android operating system. The operation of these components is discussed below.

The touch controller 202 detects and/or senses stylus input events of the stylus 106, other devices, and/or fingers of a user in contact with the touch screen to determine or receive data (for example, including x-y location information, time, pressure, etc. of the stylus input events). The touch controller 202 may receive and track location and position and other information from the stylus 106, such as an active stylus that can communicate information used to determine the location of a stylus tip on the touch screen. The touch controller 202 may also coordinate the transmission of information to the stylus 106, such as information used to configure communications between the computing device 102 and the stylus 106.

The overlay component 602 receives the data corresponding to the stylus input events and causes temporary strokes corresponding to the stylus input events to be drawn and rendered for display. For example, the overlay component 602 processes and draws strokes corresponding to the data and stores data about the strokes in a buffer to be displayed in an overlay layer via the overlay display pipeline 606, as described above. The overlay layer may be a transparent display layer created by the overlay display pipeline 606 and/or the overlay component 602. The overlay component 602 may also incorporate an identifier into the data and/or buffer that identifies that the data corresponds to the overlay component 602. This allows the temporary strokes to be processed and displayed faster than conventional processing methods by bypass the conventional processing steps described above. While certain conventional processing steps are bypassed to quickly render and display the temporary strokes, the data corresponding to the stylus input events may still be processed in the conventional fashion, for example, by the application content component 616, and the temporary strokes may transition to or be replaced by processed strokes, as described above in reference to FIGS. 3 and 4.

As described above, the application content component 616 may handle processing the data corresponding to the stylus input events in the conventional fashion (i.e., the processed strokes) after or while the respective temporary strokes are displayed. This processing may occur in parallel to the processing of the data for the temporary strokes and/or while the temporary strokes are being or have been displayed. The data corresponding to the stylus input events may be received by the application content component 616 via the touch controller 202 and/or the data may be received from the overlay component 602.

In general, when data corresponding to stylus strokes is processed in the typical fashion, the display compositor 610 waits for a synchronization event (such as the display frame refresh) (e.g., an event that occurs at the beginning of a display frame update, which typically occurs at 16 ms intervals or at 60 Hz) before sending the data to the hardware composer 612 for creation of a display frame composition, as described above. This data would include all data corresponding to stylus input event(s) that occurred between two display frame refreshes, an potentially additional data corresponding to other applications. Thus, the system bundles the data corresponding stylus input event(s) that occur between two display frame refreshes, and at each display frame refresh, processes the data corresponding to the stylus input event(s) that have happened since the previous display frame refresh. However, as described above, in addition to the conventional operation and function of the display compositor 610, the display compositor 610 is modified to recognize identifiers and pass data corresponding stylus input event(s) coming from the overlay component 602 to the hardware composer 612 without waiting for the display frame refresh. This data is then processed to display temporary strokes, as described above.

The hardware composer 612 creates the display frame composition(s) for updating the display frame and assigns a hardware pipeline of the display subsystem 608 to the display frames. For example, the hardware composer 612 assigns display frame compositions corresponding to data from the overlay component 602 to the overlay display pipeline 606 of the display subsystem 608, based on the identifier; and assigns display frame compositions corresponding to data from the application content component 616 to the application display pipeline 614 of the display subsystem 608.

The display subsystem 608 processes the data/frame compositions assigned to the overlay display pipeline 606 to display temporary strokes on the display, and the data/frame compositions assigned to the application display pipeline 614 to display processed strokes on the display. For example, the respective hardware pipeline of the display subsystem 608 scan the buffers (i.e., included in the frame compositions) and cause the display of the temporary strokes and/or processed strokes. It should be appreciated that the controllers/modules described herein may be modified and/or substituted for different controllers/modules in other operating systems.

The use of the overlay component 602 to introduce a transparent overlay layer is used to render and display the temporary strokes. The overlay component 602 cooperates with the existing controllers/modules/hardware for the application and/or operating system to render and display the temporary strokes. In an aspect, when the stylus 106 is lifted or removed from contact with the computing device 102, or if there is any size/location/visibility change detected, the temporary strokes may be transitioned to processed strokes immediately. Similarly changes to screen resolution, rotation, mirroring, or other impacts to the composition system may be detected. Further, upon the transition of the temporary strokes, the overlay component may clear the overlay layer of previously displayed temporary strokes when the corresponding processed strokes become visible/are displayed.

The above embodiments of the present disclosure are meant to be illustrative. They were chosen to explain the principles and application of the disclosure and are not intended to be exhaustive or to limit the disclosure. Many modifications and variations of the disclosed embodiments may be apparent to those of skill in the art. Persons having ordinary skill in the field of computers and/or digital imaging should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

The concepts disclosed herein may be applied within a number of different devices and computer systems, including, for example, general-purpose computing systems, televisions, stereos, radios, server-client computing systems, mainframe computing systems, telephone computing systems, laptop computers, cellular phones, personal digital assistants (PDAs), tablet computers, wearable computing devices (watches, glasses, etc.), other mobile devices, etc.

Embodiments of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk and/or other media.

Embodiments of the present disclosure may be performed in different forms of software, firmware, and/or hardware. Further, the teachings of the disclosure may be performed by an application specific integrated circuit (ASIC), field programmable gate array (FPGA), or other component, for example.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method for displaying strokes, the method comprising:
   detecting contact between a stylus and a surface of a display of a computing device, wherein the detecting occurs between a first display frame refresh and a second display frame refresh of the display consecutively following the first display frame refresh;
   determining first input data corresponding to a location and time of the contact;
   determining first stroke data corresponding to the first input data, the first stroke data being used to display a first stroke corresponding to the contact;
   storing the first stroke data in a first buffer;
   displaying the first stroke as a temporary stroke using a first hardware pipeline, wherein the first hardware pipeline includes one or more components for performing graphical post processing functions on the first stroke data, the temporary stroke being based on the first stroke data, where the temporary stroke is displayed during the second display frame refresh;

determining, by an application operating on the computing device and substantially in parallel with the determining the first stroke data, second stroke data corresponding to the first input data, the second stroke data being used to display a second stroke corresponding to the contact;

storing the second stroke data in a second buffer;

displaying the second stroke as a processed stroke using a second hardware pipeline separate from the first hardware pipeline, wherein the second hardware pipeline includes one or more components for performing graphical post processing functions on the second stroke data, wherein the processed stroke is displayed during a third display frame refresh, and the processed stroke is displayed at substantially a same location on the display as the temporary stroke; and removing the temporary stroke from the display during the third display frame refresh.

2. The computer-implemented method of claim 1, wherein:

detecting contact between the stylus and the surface of the display includes:
  detecting a first contact between the stylus and the surface of the display, and
  detecting a second contact between the stylus and the surface of the display; and
the first input data corresponds to a location and time of the first and second contacts.

3. A computer-implemented method, comprising:

detecting, by a computing device, contact between a stylus and a surface of a display of a computing device between a first display frame refresh and a second display frame refresh of the display consecutively following the first display frame refresh;

determining, by the computing device, first data corresponding to a location and time of the contact;

determining, by the computing device, first stroke data corresponding to the first data, the first stroke data being used to display a first stroke corresponding to the contact;

displaying, by the computing device, the first stroke using a first hardware pipeline during the second display frame refresh; and processing, by an application of the computing device and substantially in parallel with the determining the first stroke data, the first data to determine a second stroke corresponding to the first data, the second stroke to replace the first stroke and be displayed on the display after the first stroke is displayed.

4. The computer-implemented method of claim 3, further comprising:

storing the first stroke data in a first buffer; and processing the first stroke data in the first buffer by the first hardware pipeline between the first display frame refresh and the second display frame refresh.

5. The computer-implemented method of claim 3, further comprising displaying the second stroke during a third display frame refresh, the third display frame refresh occurring after the second display frame refresh.

6. The computer-implemented method of claim 3, further comprising displaying the second stroke using a second hardware pipeline separate from the first hardware pipeline.

7. The computer-implemented method of claim 3, further comprising, during a same frame refresh, displaying the second stroke on the display and removing the first stroke from the display.

8. The computer-implemented method of claim 7, wherein the second stroke is displayed at substantially a same location on the display as the first stroke.

9. The computer-implemented method of claim 3, further comprising:

detecting, by the computing device, second contact between a stylus and a surface of a display of the computing device;

determining, by the computing device, second data corresponding to the second contact; and delaying determining, by the computing device, third stroke data corresponding to the second data to account for latency in determining the second data, the third stroke data being used to display a third stroke corresponding to the second contact.

10. The computer-implemented method of claim 3, further comprising sending, by an overlay component of the computing device, the first data to the application for processing.

11. A computing device, comprising:

a display;

at least one processor;

a memory device including instructions operable to be executed by the at least one processor to perform a set of actions, configuring the at least one processor to:

detect contact between a stylus and a surface of a display of a computing device between a first display frame refresh and a second display frame refresh of the display consecutively following the first display frame refresh;

determine first data corresponding to a location and time of the contact;

determine first stroke data corresponding to the first data, the first stroke data being used to display a first stroke corresponding to the contact;

display the first stroke using a first hardware pipeline during the second display frame refresh; and process, substantially in parallel with the determining the first stroke data, the first data to determine a second stroke corresponding to the first data, the second stroke to replace the first stroke and be displayed on the display after the first stroke is displayed.

12. The computing device of claim 11, wherein the at least one processor is further configured to display the second stroke during a third display frame refresh, the third display frame refresh occurring after the second display frame refresh.

13. The computing device of claim 11, wherein the at least one processor is further configured to:

store the first stroke data in a first buffer; and process the first stroke data in the first buffer by the first hardware pipeline between the first display frame refresh and the second display frame refresh.

14. The computing device of claim 11, wherein the at least one processor is configured to display the second stroke using a second hardware pipeline separate from the first hardware pipeline.

15. The computing device of claim 11, wherein the at least one processor is further configured to, during a same frame refresh, display the second stroke on the display and remove the first stroke from the display.

16. The computing device of claim 15, wherein the second stroke is displayed at substantially a same location on the display as the temporary stroke.

17. The computing device of claim 11, the at least one processor is configured to allocate processing resources to allow the contact to be detected and the first stroke displayed within a refresh rate of the computing device.

18. The computing device of claim 11, wherein the at least one processor includes an overlay component and an application component and the overlay component is configured to send the first data to the application component to process the first data to determine the second stroke.

* * * * *